United States Patent [19]

Kuboshima

[11] 4,081,809

[45] Mar. 28, 1978

[54] VIEWFINDER SYSTEM FOR A LARGE CAMERA

[75] Inventor: Makoto Kuboshima, Sagamihara, Japan

[73] Assignee: Fuji Photo Film Co., Ltd., Minami-ashigara, Japan

[21] Appl. No.: 708,247

[22] Filed: Jul. 23, 1976

[30] Foreign Application Priority Data

Oct. 2, 1975 Japan ................................ 50-119437

[51] Int. Cl.² .............................................. G03B 13/02
[52] U.S. Cl. ..................................... 354/199; 354/219
[58] Field of Search ................ 354/151, 152, 155, 219, 354/190, 200, 83, 86, 197, 199, 187, 221, 222, 224, 195, 154

[56] References Cited

U.S. PATENT DOCUMENTS

| 2,219,314 | 10/1940 | Hoch | 354/221 |
| 2,909,109 | 10/1959 | Back | 354/155 |
| 2,949,833 | 8/1960 | Steineck | 354/151 |
| 3,791,274 | 2/1974 | Hansen | 354/219 X |

FOREIGN PATENT DOCUMENTS

| 211,662 | 10/1960 | Austria | 354/224 |
| 456,278 | 3/1950 | Italy | 354/224 |
| 183,479 | 4/1936 | Sweden | 354/199 |
| 443,342 | 2/1936 | United Kingdom | 354/199 |

Primary Examiner—Donald A. Griffin
Attorney, Agent, or Firm—Sughrue, Rothwell, Mion, Zinn and Macpeak

[57] ABSTRACT

Large camera viewfinder system in which an eyepiece is positioned at an upper rear portion of the camera, to permit eye-level viewing and free adjustment of camera attitude and a viewfinder objective lens assembly which has the same focal length as and is movable equivalent amounts simultaneously with a movable front lens assembly of a taking lens assembly, is positioned level with and a short distance from the taking lens assembly, the viewfinder objective lens assembly and eyepiece being on opposite sides of the optical axis of the taking lens assembly, and light being transmitted therebetween by an optical system inside the camera. With the viewfinder objective lens assembly being close to the taking lens assembly but a comparatively long distance from the viewfinder eyepiece problems of parallax are minimum and image erection can be effected by a simple lens means, a heavy and expensive prism such as a roof-angle prism being unnecessary.

3 Claims, 2 Drawing Figures

VIEWFINDER SYSTEM FOR A LARGE CAMERA

BACKGROUND OF THE INVENTION

1. Field of the Invention

The present invention relates to a camera viewfinder system and, more particularly, to a viewfinder system for a large camera, employing negatives of 4 × 5 or 6 × 6 format, for example.

2. Description of the Prior Art

It is known to provide a large camera with a viewfinder of the so-called groundglass type, such as employed in twin lens reflex cameras for example, this type of viewfinder having the advantages that there are no undue problems of parallax and that it is generally possible to accurately determine whether or not a scene which it is desired to photograph is correctly focussed by the taking lens system of the camera. However, such a viewfinder has the disadvantage that, compared to a viewfinder system which permits eye-level viewing, procedure for adjustment of focus is somewhat inconvenient, since it must be effected while the photographer is looking down into the viewfinder system, and it may not always be possible to correctly focus the camera in a short time, as is required in taking action shots for example. Another disadvantage with this type of viewfinder is that if it is required to employ film having rectangular frames, the film frame side which constitutes the base of a photograph, i.e., the horizontal line of a photographed scene, must always be the same, and it is not possible to alternately make the long and short sides of film frames the bases of photographs, as may be required for practical or artistic purposes.

When the camera employed is of the so-called autoprocess type, i.e., a camera in which film is in the form of independent film units each of which is processed inside the camera immediately subsequent to exposure thereof and then moved to the exterior of the camera, whereby a completed print is obtained in a very short time, there is the particular problem that, if as is most convenient from the point of view of holding the camera and of support of a film unit exiting from the camera, it is not possible to correctly view a scene in the viewfinder system while a processed film unit is being moved out of the camera, which is inconvenient when it is desired to take photographs in comparatively rapid succession.

Another disadvantage with this type of viewfinder when employed in a large camera is that since the viewing screen employed in comparatively large and other viewfinder elements must be made proportionately large, overall size of the camera tends to be such that the camera is bulky and difficult to handle.

Most of these problems may be avoided by provision of a viewfinder system of the so-called direct vision type, which is mounted on top or side portion of the camera, for example, and permits eye-level viewing so permitting easy and rapid handling of camera controls and also easy change of the camera to or from a horizontal or vertical position, it further being known to provide direct vision viewfinder systems in which focus is adjustable simultaneously with that of a taking lens system. The main problem associated with this type of viewfinder is that of parallax. This problem is particularly severe in a large camera since the viewfinder system is inevitably a considerable distance from the taking lens system located in a generally central portion of the camera to the viewfinder. Problems of making correction for parallax therefore become complicated, and since a large amount of tilting or compensatory inclination of the camera must be effected in order to ensure a photograph of a scene which is framed in a required manner, particularly in taking close-up shots, the correct amount of compensatory inclination is often difficult to determine or sense, particularly for an amateur.

It is of course possible to allow free positioning of a camera and also avoid problems of parallax by provision of a viewfinder system of the single lens reflex type. But since such a type of viewfinder must include a movable mirror portion large enough to prevent exposure of film prior to actuation of a shutter means, in a large camera the viewfinder system as a whole must be large and in particular there are mechanical problems with respect to ensuring that the large, and hence comparatively heavy mirror, is always moved in a required manner. If this type of viewfinder system is provided in an auto-process camera there are further problems of construction and design since mirror actuation means and means for effecting forwarding of exposed film units out of the camera must all be provided is side portions generally to the rear of the camera.

Another disadvantage in conventional viewfinder systems is that since it is required to obtain an erect image at the eyepiece of a viewfinder system, and since if simple lenses only are employed to effect image erection an optical path length cannot be less than a certain minimum, which is at least equal to the combined focal lengths of the objective lens and erector lens means employed in the viewfinder, in order to keep viewfinder size as small as possible it is practice to make use of a roof-angle prism, which is expensive, and unduly increases the weight of a large camera.

It is accordingly a principle object of the invention to provide a viewfinder system which makes it possible to determine whether a scene is correctly focussed by a taking lens assembly and permits free camera-positioning to obtain photographs of scenes framed in a required manner, but is the source of minimum problems of parallax in a large camera.

It is a further object of the invention to provide a viewfinder system for a large camera having a construction which requires use of light, compact and inexpensive element only.

SUMMARY OF THE INVENTION

In accomplishing these and other objects there is provided according to the present invention a viewfinder system comprising an objective lens assembly which is located at the front portion of a camera adjacent to the camera taking lens system, thereby reducing problems of parallax, and has a focal length equal to and is movable forwardly and rearwardly together with the front lens assembly of the taking lens system, whereby matching focus of different scenes to be photographed may be achieved by the viewfinder system and the taking lens system. Light entering the viewfinder system is first directed upwards and then along a path, which avoids the path of light for exposure of film and on which there is provided a relay and erector lens or lens assembly, to the viewfinder eyepiece, which is positioned at an upper corner or upper, side portion of the camera or on top of the camera. The viewfinder system of the invention thus permits eye-level viewing, which offers the advantage that adjustment of focus in general is made easier, and also that a photographer may easily position the camera so that either the long side or the short side of a film frame becomes the base of a photograph and still effect correct focussing. Image erection by a simple relay lens or lens assembly is made possible since the objective lens assembly of the viewfinder system is on the opposite side of the camera taking lens system to the viewfinder eyepiece, whereby the optical path from the objective lens assembly to the eyepiece of the viewfinder system is made suitably long and it is made possible to dispense with the heavy and expensive roof-angle prism such as commonly employed in a viewfinder focussing system. Also, since the viewfinder system is independent of and is not required to be proportional in size to the taking lens system, there is no longer the disadvantage of overall size becoming unduly large in a camera for large format film.

A better understanding of the present invention may be had from the following full description thereof when read in reference to the attached drawings, in which like numbers refer to like parts, and

DESCRIPTION OF THE PREFERRED EMBODIMENT

Figure 1:
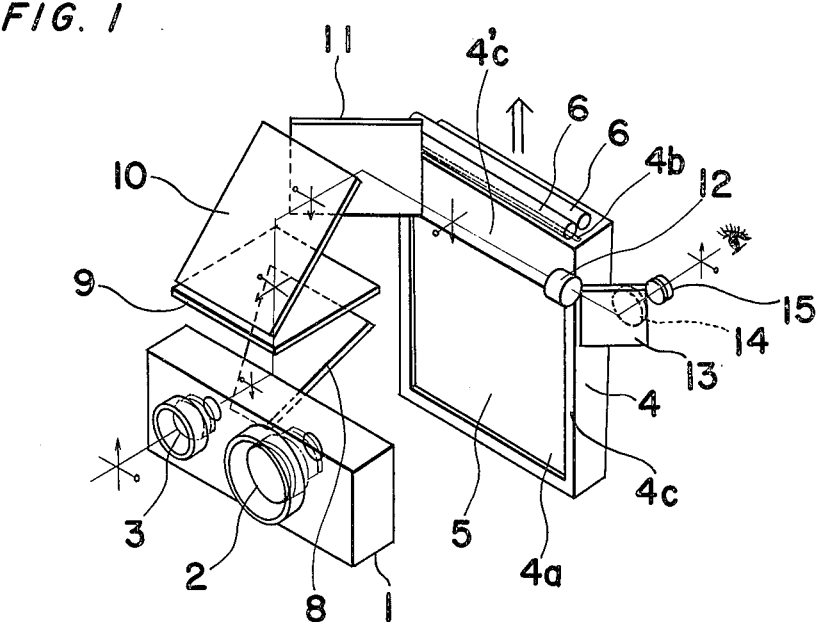
FIG. 1 is an illustrative, perspective disassembly view of a camera including a viewfinder system according to the invention.

In the drawings, which show the viewfinder system of the invention in association with an auto-process camera, there is shown a taking lens assembly 2 which is mounted in and supported by a support block 1 provided in a forward part of the camera, the support block 1 being in attachment to camera main body portions (not shown in the drawings). The taking lens assembly 2 as a whole has a comparatively long focal length and may, upon opening of a suitably controlled shutter means (not shown, direct image-wise light reflected from a scene to be photographed onto a foremost film unit 5 provided together with other film units in a pack or container 4 which is made of comparatively rigid material and the front portion of which is constituted by a frame 4c which defines an exposure opening 4a and surrounds the photosensitive portion of the foremost film unit 5. Subsequent to exposure thereof, the film unit 5 is moved upwards and out of the container 4 via a slit 4b defined in the upper wall of the container 4, as indicated by the arrow in FIG. 1, by friction rolls and similar known elements (not shown) and a pair of processing rolls 6 whose line of junction is in line with the slit 4b and which also act to break open processing solution pods provided in a leading edge portion of the film unit 5, and to spread processing solution through the film unit, whereby, there is produced, in a known manner, a positive image in the film unit, the processed film unit being eventually moved to the exterior of the camera via an exit opening (not shown), and a succeeding film unit being brought to the foremost position in the container 4 in readiness for production of a subsequent photograph.

Figure 2:
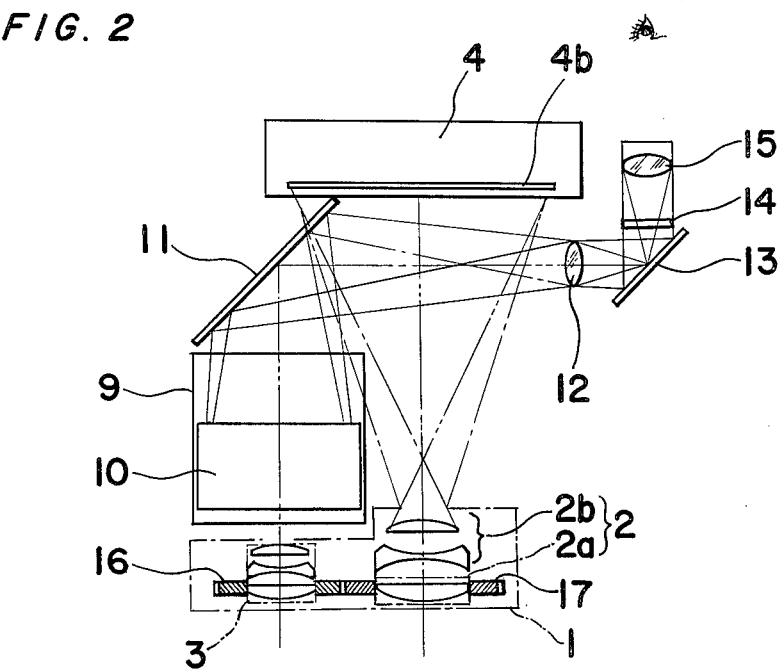
FIG. 2 is a horizontal cross-sectional view of the camera of FIG. 1 illustrating optical paths therein.

As shown most clearly in FIG. 2, the taking lens assembly 2 includes a rear lens assembly 2b, which is fixed, and a front lens assembly 2a which is movable forwardly or rearwardly, by, for example, a helical keyway means or similar means which is externally actuable by a photographer in order to focus scenes at different distances from the camera. Around the means for moving the front lens assembly 2a there is fixedly mounted an externally toothed gear 17, which is caused to rotate when the front lens assembly 2a is moved forwards or rearwards in the support block 1.

Also mounted in the support block 1, at a set distance from and horizontally level with the taking lens assembly 2, there is a viewfinder objective lens assembly 3 which has a focal length equal to that of the front lens assembly 2a alone in the taking lens assembly 2 and is so supported that the optical axis thereof is always parallel to that of the taking lens assembly 2, the viewfinder lens assembly 3 being positioned to the left of the taking lens assembly 2 as seen in the drawings. Forward and rearward movement of the viewfinder objective lens assembly 3 may be effected by known means which is itself actuated by an externally toothed gear 16 which is engaged by the gear 17 on the extension and retraction means of the front lens assembly 2a of the taking lens assembly 2, whereby the lens assemblies 2a and 3 may be simultaneously moved equal distances forwards or rearwards when the photographer causes the lens assembly 2a to be moved to different focussing settings.

The actuation and connection means for causing such simultaneous movement of the lens assemblies 2 and 3 may be, for example, known means such as employed in conventional twin lens reflex cameras, or helical keyway means such as disclosed by the present applicant in Japanese Patent Publication No. 49-93595.

Image-wise light entering the viewfinder objective lens assembly 3 impinges on a first reflecting mirror 8 which is provided immediately to the rear of the support block 1, is inclined rearwardly upwards and is at an angle of 45° with respect to the optical axis of the lens assembly 3. The first reflecting mirror 8 directs the image-wise light upwards, through a transparent, horizontally disposed first focussing screen 9 and onto a second reflecting mirror 10 which is disposed parallel to the first mirror 8 in an upper, forward portion of the camera.

The first focussing screen 9, which is constituted by a Fresnel lens or split lens or has a similar conventionally known construction permitting initial focussing of the scene carried by the image-wise light, is so located that it lies on the principal focal plane of the viewfinder lens assembly 3 when the lens assembly 3 is at its most rearward position in the support block 1.

The second mirror 10 directs the focussed image onto a third reflecting mirror 11 which is in a rear, upper portion of the camera and is so disposed that it directs the image horizontally across a comparatively broad upper stretch portion 4c' of the front frame 4c of the film unit container 4, through a relay lens 12, which also serves to erect the inverted image, and to a comparatively small fourth reflecting mirror 13, which is disposed parallel to the third mirror 11, which, in terms of lines which are in front to rear alignment with respect to the camera, is positioned out of line with the film unit container 4, and which is on the opposite side of the optical axis of the taking lens assembly 2 to the viewfinder objective lens assembly 3, the third reflecting mirror 11 directing image-wise light from left to right as seen in the drawings. The image-wise light is directed by the fourth mirror 13 through a second focussing screen 14, which lies on the focal plane of the relay lens 12, and to a viewfinder eyepiece 15, which is provided in an upper rear portion of the camera for example, and through which the photographer may observe a scene to be photographed. Because of the engagement of the gears (not shown), the scene viewed in the eyepiece 15 is focussed in the same manner as by the taking lens assembly 2. There are suitably provided in the camera interior partition wall means, (not shown), which as well as defining an exposure chamber and mounting portions for the film unit container 4, also serve to prevent light passing along the optical path defined in the viewfinder system from interfering with light directed into the camera interior by the taking lens system.

It is to be noted that with the viewfinder system of the invention, although a clearly focussed erect image may be obtained in correspondence to focussing effected by a camera taking lens system, horizontally and vertically of the camera may be changed freely, and, it is not necessary to provide a heavy and expensive roof-angle prism since an optical path of sufficient length is established within space defined inside the camera and image erection may be effected by a small relay lens. As well as being lighter and less expensive, this construction has the further advantage that, since mirrors and other viewfinder elements may easily be pivotally mounted, the viewfinder system permits an extremely compact overall construction, especially when included in the so-called folding- or collapsible- type camera, which, when not in use may be folded into the shape of a comparatively flat case for more convenient transport.

As may be best appreciated from FIG. 2, the objective lens assembly 3 of the viewfinder system may be comparatively close to the taking lens assembly 2, since the distance between the assemblies 3 and 2 need not be any greater than that necessary to ensure that light entering the viewfinder system does not interfere with light emerging from the taking lens assembly 2, i.e., light entering the film exposure system. As image-wise light entering the viewfinder system is directed away from the path of exposure light by the first mirror 8 shortly after passing through the objective lens assembly 3, in practical terms the distance of the assembly 3 from the taking lens assembly 2 need not be greater than about one half the width of a film unit 5. Thus, in effect, although the viewfinder eyepiece is at a convenient location for viewing and is a considerable distance from the taking lens assembly, optically the viewfinder system and taking lens assembly are very close and problems of parallax are therefore greatly reduced.

Needless to say, although the viewfinder system of invention has been described in reference to a specific type of large camera, the same advantages are achieved by employment thereof in association with other types of camera, for example an auto-process camera employing film units in separate flexible containers or defining a side exit for exiting of processed film unit, or large cameras employing conventionally processed film or plates.

What is claimed is:

1. In a camera having a forward portion and a rear portion and employing a large format film, said camera comprising a taking lens assembly which includes a front lens assembly and a rear lens assembly supported in said forward portion of said camera for focussing the image of a scene to be photographed on film material in said rear portion of said camera, at least said front lens assembly being movable, externally actuable focussing control means for moving at least said front lens assembly forwardly and rearwardly with respect to said film material, the improvement comprising: a viewfinder system having an objective lens assembly which has a focal length equal to that of said front lens assembly and being generally level with and at a set distance to one side of said taking lens assembly within said camera forward portion, and being movable forwardly and rearwardly relative to said camera forward portion, connection and actuation means for causing said viewfinder objective lens assembly to be simultaneously moved forwardly and rearwardly a distance equal to that moved by said front lens assembly upon actuation of said focussing control means, an eyepiece located at an upper rear portion of said camera and on the opposite side of the optical axis of said taking lens assembly to that of said objective lens assembly, said viewfinder system including an optical system provided inside said camera, said optical system including an erecting relay lens means and means for transmitting image-wise light over a path leading from said objective lens assembly, rearwardly, upwardly and across a vertical plane passing through the optical axis of the taking lens assembly and through said erecting relay lens means to said eyepiece and to thus avoid the path of light directed by said taking lens assembly onto said film material, and wherein said viewfinder optical system path extends over a distance which is greater than the sum of the focal lengths of said objective lens assembly and said erecting relay lens means.

2. The camera as claimed in claim 1, wherein said optical system means for transmitting image-wise light comprises a first reflecting mirror which with respect to said camera field of view is provided immediately behind said objective lens assembly, is inclined upwardly and rearwardly at an angle of approximately 45° with respect to the optical axis of said objective lens assembly to receive image-wise light emerging from said objective lens assembly, and for directing said image-wise light vertically upwards, a horizontally disposed transparent first focussing screen being mounted above said first reflecting mirror and lying on the principal focal plane of said objective lens assembly, a second reflecting mirror being positioned above said first focussing screen, being parallel to said first reflecting mirror for directing said image-wise light rearwardly, a third reflecting mirror being disposed rearwardly of said second reflecting mirror for receiving image-wise light reflected by said second reflecting mirror, and being disposed so as to effect approximately 90° reflection of received image-wise light and to direct said image-wise light crosswise with respect to said camera, across a vertical plane passing through the optical axis of said taking lens assembly, and wherein said erecting relay lens means is provided on said path of said image-wise light reflected by said third reflecting mirror, and said optical system means for transmitting image-wise light of said viewfinder system further comprising a small fourth reflecting mirror being disposed parallel to said third reflecting mirror and positioned to receive image-wise light which has passed through said erecting relay lens means, and for directing said image-wise light rearwardly, and a vertically disposed transparent second focussing screen positioned to the rear of said fourth reflecting mirror for receiving image-wise light reflected from said fourth reflecting mirror, which lies on a focal plane of said erecting relay lens means and for focussing an image carried by said image-wise light, for viewing through said eyepiece.

3. The camera as claimed in claim 2, wherein said first, second and third reflecting mirrors and said first focussing screen are pivotally mounted to form a foldable viewfinder system.

* * * * *